United States Patent
Bai et al.

(10) Patent No.: US 10,073,698 B2
(45) Date of Patent: Sep. 11, 2018

(54) PIPELINED PROCESSOR WITH MULTI-ISSUE MICROCODE UNIT HAVING LOCAL BRANCH DECODER

(71) Applicant: VIA ALLIANCE SEMICONDUCTOR CO., LTD., Shanghai (CN)

(72) Inventors: Longfei Bai, Shanghai (CN); Zhenhua Huang, Shanghai (CN); Mengmeng Yan, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 171 days.

(21) Appl. No.: 15/332,403

(22) Filed: Oct. 24, 2016

(65) Prior Publication Data
US 2018/0095753 A1    Apr. 5, 2018

(30) Foreign Application Priority Data

Sep. 30, 2016    (CN) .......................... 2016 1 0875658

(51) Int. Cl.
*G06F 9/38*    (2018.01)
*G06F 9/30*    (2018.01)
(Continued)

(52) U.S. Cl.
CPC .............. *G06F 9/3016* (2013.01); *G06F 9/28* (2013.01); *G06F 9/3017* (2013.01);
(Continued)

(58) Field of Classification Search
None
See application file for complete search history.

(56) References Cited

U.S. PATENT DOCUMENTS 6,898,697 B1 *   5/2005   Gao ................... G06F 9/30076
                                                        710/33
6,968,446 B1 *  11/2005   McGrath ............ G06F 9/30054
                                                        712/224

(Continued)

*Primary Examiner* — Eric Coleman
(74) *Attorney, Agent, or Firm* — McClure, Qualey & Rodack, LLP

(57) ABSTRACT

A processor has an execution pipeline that executes microinstructions and an instruction translator that translates architectural instructions into the microinstructions. The instruction translator has a memory that holds microcode instructions and provides a fetch quantum of a plurality of microcode instructions per clock cycle, a queue that holds microcode instructions provided by the memory, and a branch decoder that decodes the fetch quantum to detect local branch instructions, causes microcode instructions of the fetch quantum up to but not including a first-in-program-order local branch instruction to be written to the queue, and prevents the first-in-program-order local branch instruction and following microcode instructions of the fetch quantum from being written to the queue. Local branch instructions are resolved by the instruction translator rather than the execution pipeline. Microcode translators translate multiple microcode instructions received from the queue per clock cycle into microinstructions for provision to the execution pipeline.

21 Claims, 3 Drawing Sheets

(51) Int. Cl.
*G06F 9/28* (2006.01)
*G06F 9/32* (2018.01)

(52) U.S. Cl.
CPC ...... *G06F 9/30058* (2013.01); *G06F 9/30145* (2013.01); *G06F 9/322* (2013.01); *G06F 9/324* (2013.01); *G06F 9/3802* (2013.01); *G06F 9/3804* (2013.01); *G06F 9/3814* (2013.01); *G06F 9/3822* (2013.01); *G06F 9/3842* (2013.01); *G06F 9/3867* (2013.01)

(56) References Cited

U.S. PATENT DOCUMENTS

| | | | | |
|---|---|---|---|---|
| 2002/0099926 A1* | 7/2002 | Sinharoy | ............... | G06F 9/3804 712/207 |
| 2003/0212879 A1* | 11/2003 | Henkel | ............... | G06F 9/30178 712/208 |
| 2010/0205407 A1* | 8/2010 | Henry | ................. | G06F 9/30058 712/216 |

* cited by examiner

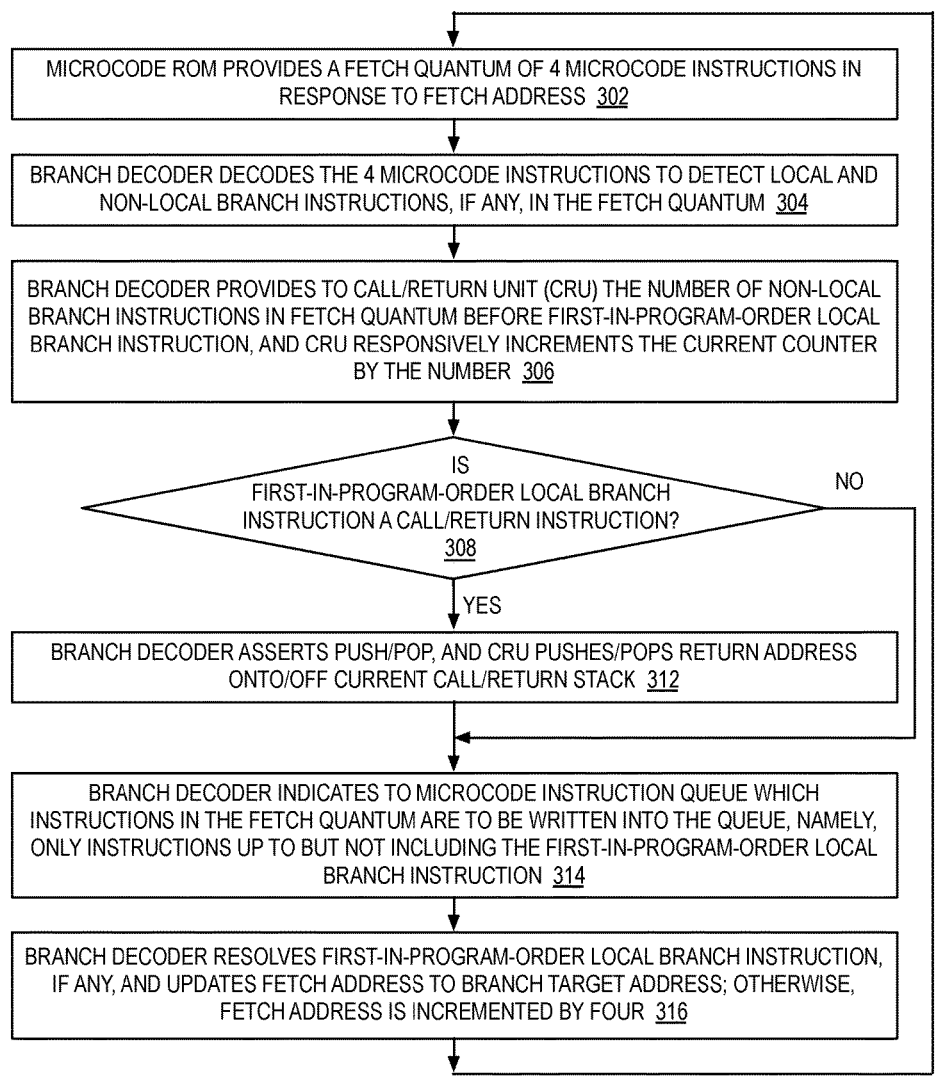

PIPELINED PROCESSOR WITH MULTI-ISSUE MICROCODE UNIT HAVING LOCAL BRANCH DECODER

CROSS REFERENCE TO RELATED APPLICATION(S)

This application claims priority to China Application No. 201610875658.6, filed Sep. 30, 2016, which is hereby incorporated by reference in its entirety.

BACKGROUND

There is a constant demand for performance improvement of stored program processors, commonly referred to as central processing units (CPU) and microprocessors. Historically, some processors have included microcode to perform at least some architectural instructions of the instruction set architecture (ISA) of the processor and to service exceptions. Conventional processors fetch a single microcode instruction from a microcode memory of the processor per clock cycle, which may limit the performance of microcoded architectural instructions and/or exception service routines, particularly in processors that have the ability to process multiple instructions per clock.

BRIEF DESCRIPTION OF THE DRAWINGS

FIG. 3 is a flowchart illustrating operation of the microcode unit of FIG. 2.

FIG. 4 is a flowchart illustrating operation of the microcode unit of FIG. 2.

DETAILED DESCRIPTION OF THE EMBODIMENTS

Glossary

A local branch instruction is a branch instruction that is resolved by the instruction translator rather than by the execution pipeline of the processor. The local branch instruction may be an unconditional branch instruction, such as an unconditional jump instruction, a call instruction, or a return instruction whose target address may be obtained from a call/return stack of the instruction translator. The local branch instruction may also be a conditional branch instruction whose condition is resolvable by the instruction translator and therefore does not need to be resolved by the execution pipeline, such as a static condition.

A non-local branch instruction is a branch instruction that is resolved by the execution pipeline of the processor.

Microcode is routines, or program threads, of instructions that are non-architectural instructions stored in a non-architectural memory of the processor that are used to accomplish architectural instruction execution and/or to service exceptions. The architectural instructions whose execution is accomplished by microcode are typically complex and/or infrequently executed. The exceptions serviced by microcode may be architectural and/or micro-architectural exceptions. A microcode routine may include one or more branch instructions.

A microinstruction is an instruction executed by one or more of the execution units of the processor and that is defined by an instruction set that is distinct from the instruction set defined by the ISA of the processor. An example of the ISA of the processor is the x86 ISA. An architectural instruction is translated into one or more microinstructions. The collective execution of the one or more microinstructions by the execution units implements the architectural instruction, i.e., performs the operations necessary to generate the results of the architectural instruction as defined by the ISA.

Figure 1:
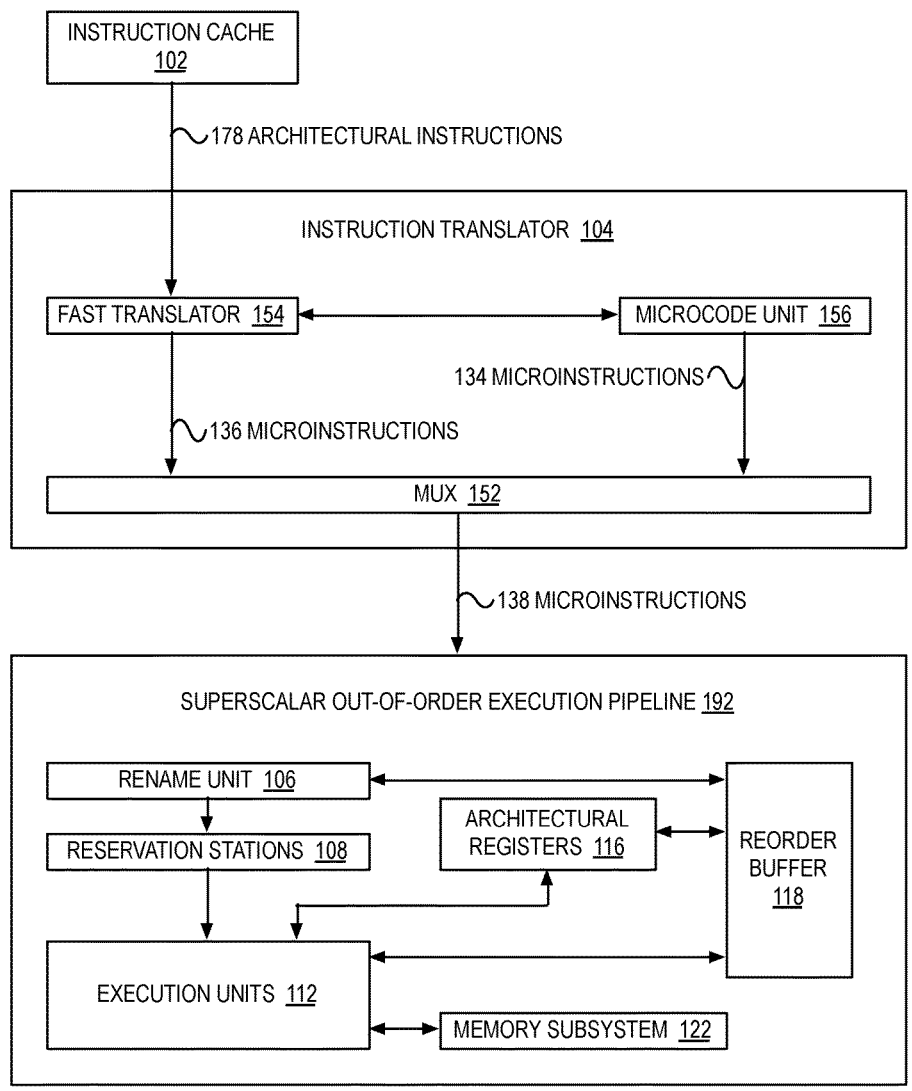
FIG. 1 is a block diagram illustrating a processor.

Referring now to FIG. 1, a block diagram illustrating a processor 100 is shown. The processor 100 includes an instruction cache 102, an instruction translator 104, and a superscalar out-of-order execution pipeline 192. The instruction cache 102 caches architectural instructions from system memory and provides the architectural instructions 178 to the instruction translator 104 based on the architectural program counter (not shown). The instruction translator 104 translates the architectural instructions 178 into microinstructions 138 that it provides to the execution pipeline 192. The execution pipeline 192 executes the microinstructions 138 to produce the results of the translated architectural instructions 178 as defined by the ISA of the processor 100. In one embodiment, the processor 100 ISA is the x86 ISA. Advantageously, the instruction translator 104 fetches multiple microcode instructions (see, e.g., microcode instructions 272 of FIG. 2) per clock cycle for translation into microinstructions 138 to increase the throughput of microinstructions 138 provided per clock cycle to the execution pipeline 192, as described in more detail herein, over the throughput of a conventional processor that fetches a single microcode instruction per clock cycle. This potentially improves the performance of micro-coded architectural instructions 178 and/or improves the performance of microcode that services exceptions, such as interrupts, over the performance of a conventional processor that fetches a single microcode instruction per clock cycle.

The execution pipeline 192 includes a rename unit 106, reservation stations 108, execution units 112, architectural registers 116, a reorder buffer 118, and a memory subsystem 122. The execution units 112 execute the microinstructions 138. In one embodiment, the execution units 112 include one or more integer units, one or more media/floating-point units, one or more branch units, and one or more load/store units. Preferably, the memory subsystem 122 includes a memory order buffer, one or more cache memories (e.g., level-1 instruction cache, level-1 data cache), translation lookaside buffers, a tablewalk engine, one or more data prefetchers, a write-combine buffer, and various request queues, such as a load queue, store queue, snoop queue and fill queue.

The instruction translator 104 provides the microinstructions 138 to the rename unit 106 in program order. The rename unit 106 receives the microinstructions 138 from the instruction translator 104 and allocates an entry in the reorder buffer 118 for each of the microinstructions 138 in program order. Preferably, the reorder buffer 118 is a circular queue, and entries in the reorder buffer 118 are allocated in order to retain the program order of the microinstructions 138. The execution units 112 execute the microinstructions 138 out of program order. However, the rename unit 106 checks for dependencies among the microinstructions 138 and sends the dependency information down the execution pipeline 192 along with the microinstructions 138. The reservation stations 108 hold the microinstructions 138 until they are ready to execute. The reservation stations 108 and a scheduler (not shown) use the dependency information to insure that a microinstruction 138 does not get issued to an execution unit 112 for execution until it is ready to execute. A microinstruction 138 is ready to execute when an execution unit 112 is available to execute it and when all of its source operands are available. More specifically, a microinstruction's 138 source operand is available when any microinstruction 138 upon which it is dependent has executed and generated its result that is the source operand.

In one embodiment, the reorder buffer 118 includes a field in each entry for storing the result of an executed microinstruction 138. When a microinstruction 138 has executed and generated its result for provision on a result bus for provision to the reorder buffer 118, the microinstruction's 138 reorder buffer 118 entry is marked as executed. However, the microinstruction 138 may not be retired, i.e., its result may not be committed to architectural state, until the microinstruction 138 is the oldest microinstruction 138 in the execution pipeline 192. Thus, although the execution units 112 execute the microinstructions 138 out of program order, the rename unit 106 and reorder buffer 118 operate together to insure that the microinstructions 138 are retired in program order. Preferably, the results are also forwarded back to the execution units 112 via a forwarding bus for use in the next clock cycle if necessary. Preferably, the execution pipeline 192 is configured to retire up to the four oldest microinstructions 138 per clock cycle. Once all of the microinstructions 138 into which an architectural instruction 178 has been translated have been retired, then the architectural instruction 178 has been retired. For example, when the microinstruction 138 retires that is the last microinstruction 138 of the microcode routine that implements an architectural instruction 178, then the architectural instruction 178 has been retired.

In the embodiment in which the reorder buffer 118 entries include storage for each microinstruction's 138 result, retiring the microinstruction 138 includes writing the result to the appropriate architectural register 116. In an alternate embodiment, the execution pipeline 192 includes a physical register file (not shown), which is the storage for the architectural registers 116, and the reorder buffer 118 entries do not include storage for a result. Instead, the rename unit 106 assigns a register in the physical register file for each microinstruction's 138 result, and the rename unit 106 checks dependencies based on the assigned registers in the physical register file. The rename unit 106 also maintains a table that indicates the state of each register in the physical register file. More specifically, when a microinstruction 138 retires, the rename unit 106 updates the state of the register of the physical register file holding the result of the microinstruction 138 to indicate that it now contains the architectural state of the associated architectural register 116.

The instruction translator 104 includes a fast translator 154, a microcode unit 156, and a mux 152. The fast translator 154 translates architectural instructions 178 into microinstructions 136. The microcode unit 156 translates architectural instructions 178 into microinstructions 134. The mux 152 selects either the microinstructions 136 from the fast translator 154 or the microinstructions 134 from the microcode unit 156, depending upon the mode of the instruction translator 104, for provision as microinstructions 138 to the execution pipeline 192. In one embodiment, a queue (not shown) buffers the microinstructions 138 for provision to the execution pipeline 192.

The fast translator 154 translates relatively simple and/or frequently executed architectural instructions 178. Preferably, the fast translator 154 comprises a collection of programmable logic arrays that, for a subset of the architectural instructions 178, translate each architectural instruction 178 into one or more microinstructions 136, preferably in a single clock cycle. In one embodiment, the fast translator 154 is capable of translating up to four architectural instructions 178 per clock cycle and providing up to six microinstructions 136 per clock cycle. While the fast translator 154 is able to translate architectural instructions 178, the instruction translator 104 remains in fast translate mode, in which case the mux 152 selects the microinstructions 136 generated by the fast translator 154.

However, when the fast translator 154 encounters a micro-coded architectural instruction 178 or is notified of an exception condition, the fast translator 154 stops translating architectural instructions 178 and transfers control to the microcode unit 156 and changes into microcode mode, in which case the mux 152 selects the microinstructions 134 generated by the microcode unit 156. In this case, the fast translator 154 provides an address of a microcode routine stored in a microcode ROM 202 (see FIG. 2) that performs the micro-coded architectural instruction 178 or services the exception. The microcode unit 156 and its operation are described in more detail with respect to the remaining Figures below.

In one embodiment, some of the architectural instructions 178 are hybrid. That is, the fast translator 154 provides a portion of the microinstructions 136 and the remainder of the architectural instruction 178 is micro-coded, i.e., after the fast translator 154 provides a head portion of the microinstructions 136 in fast translate mode, then the mode is changed to microcode mode and control is transferred to the microcode unit 156 so that a microcode routine can perform the remainder of the functionality of the architectural instruction 178 through the microinstructions 134 provided by the microcode unit 156.

Advantageously, the instruction translator 104 fetches multiple microcode instructions per clock cycle, as described in more detail below, to increase the throughput of microinstructions 138 provided to the execution pipeline 192 to take advantage of and increase the utilization of the superscalar capabilities of the execution pipeline 192 for micro-coded architectural instructions 178 and/or micro-coded exception service routines.

Figure 2:
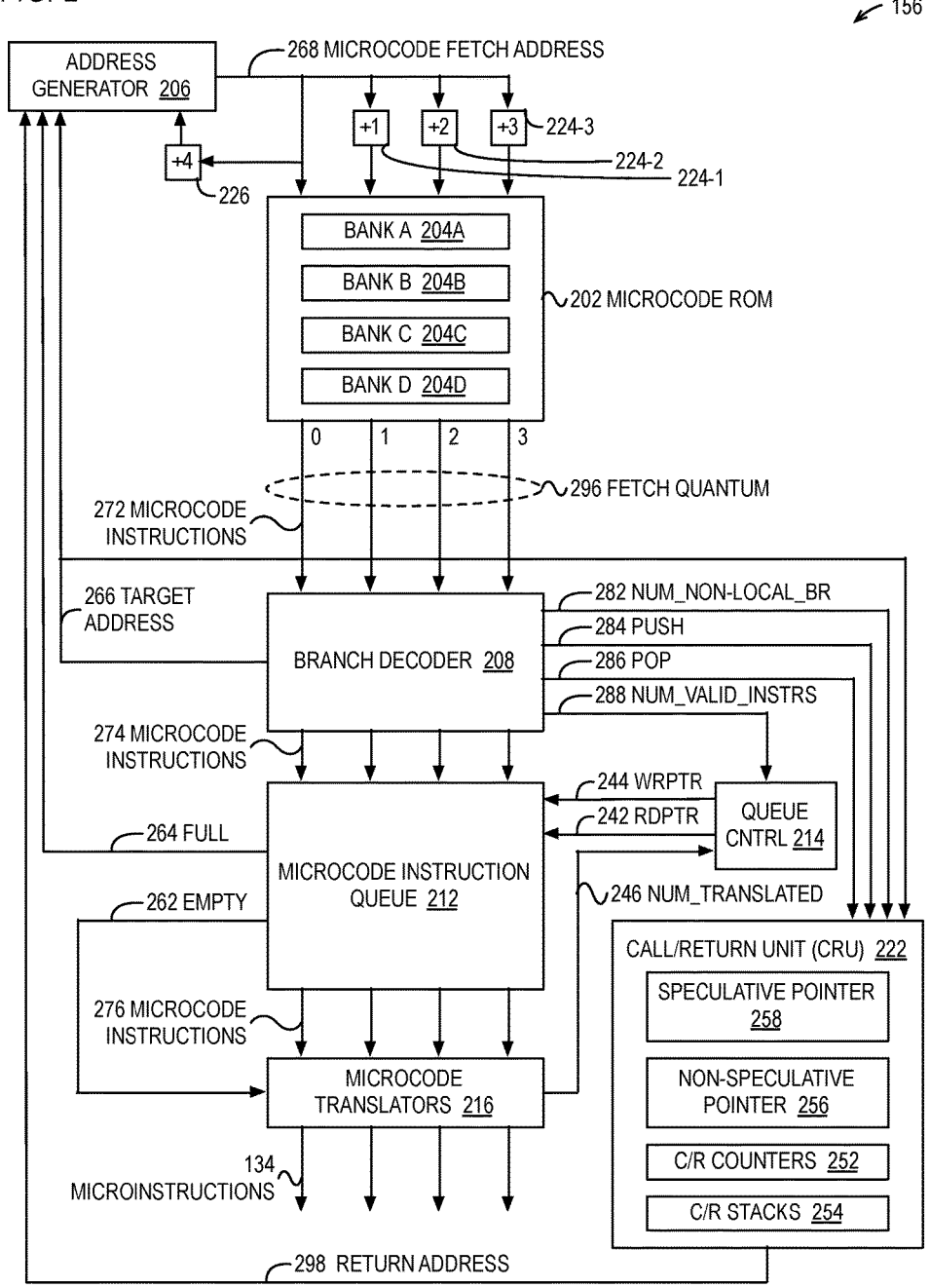
FIG. 2 is a block diagram illustrating in more detail the instruction translator of the processor of FIG. 1.

Referring now to FIG. 2, a block diagram illustrating in more detail the instruction translator 104 of the processor 100 of FIG. 1 is shown. The instruction translator 104 includes an address generator 206, a microcode ROM 202, a branch decoder 208, a microcode instruction queue 212, a queue controller 214, a plurality of microcode translators 216, and a call/return unit 222 (CRU). The microcode ROM 202 is a banked memory that includes four separately addressable banks—bank A 204A, bank B 204B, bank C 204C, and bank D 204D—which are referred to collectively as banks 204 and individually as a bank 204. In this manner, the microcode ROM 202 advantageously provides four microcode instructions 272, referred to herein as a fetch quantum 296, to the branch decoder 208 per clock cycle. As shown, the microcode ROM 202 provides the four microcode instructions 272 on four respective lanes, denoted 0 through 3, to the branch decoder 208. Lane 0 provides the first microinstruction 272 in program order, lane 1 provides the second microinstruction 272 in program order, lane 2 provides the third microinstruction 272 in program order, and lane 3 provides the fourth microinstruction 272 in program order. According to one embodiment, each bank 204 advantageously has a single read port to minimize its size and power consumption.

The address generator 206 generates a microcode fetch address 268 that is provided to the microcode ROM 202. A first adder 224-1 increments the fetch address 268 by one, a second adder 224-2 increments the fetch address 268 by two, and a third adder 224-3 increments the fetch address 268 by three, and each of the respective incremented addresses is provided to the microcode ROM 202 along with the fetch address 268. The four addresses are each provided to a respective bank 204 of the microcode ROM 202 to accomplish fetching of four sequential microcode instructions 272 of the fetch quantum 296. Preferably, the microcode ROM 202 includes a first set of muxes (not shown) that direct each of the four addresses to the appropriate one of the four banks 204 and a second set of muxes (not shown) that direct each of the four microcode instructions 272 provided by the four banks 204 to the appropriate lane of the branch decoder 208 depending upon the two least significant bits of the fetch address 268. Preferably, if the value of the lower two bits of the fetch address 268 are zero, the fetch address 268 is provided to bank A 204A, the incremented-by-one address is provided to bank B 204B, the incremented-by-two address is provided to bank C 204C, and the incremented-by-three address is provided to bank D 204D; if the value of the lower two bits of the fetch address 268 are one, the fetch address 268 is provided to bank B 204B, the incremented-by-one address is provided to bank C 204C, the incremented-by-two address is provided to bank D 204D, and the incremented-by-three address is provided to bank A 204A; if the value of the lower two bits of the fetch address 268 are two, the fetch address 268 is provided to bank C 204C, the incremented-by-one address is provided to bank D 204D, the incremented-by-two address is provided to bank A 204A, and the incremented-by-three address is provided to bank B 204B; and if the value of the lower two bits of the fetch address 268 are three, the fetch address 268 is provided to bank D 204D, the incremented-by-one address is provided to bank A 204A, the incremented-by-two address is provided to bank B 204B, and the incremented-by-three address is provided to bank C 204C. Similarly, the output of bank A 204A is provided to the lane of the branch decoder 208 corresponding to the value of the lower two bits of the fetch address 268 modulo four; the output of bank B 204B is provided to the lane of the branch decoder 208 corresponding to the value of the lower two bits of the fetch address 268 plus one and modulo four; the output of bank C 204C is provided to the lane of the branch decoder 208 corresponding to the value of the lower two bits of the fetch address 268 plus two and modulo four; and the output of bank D 204D is provided to the lane of the branch decoder 208 corresponding to the value of the lower two bits of the fetch address 268 plus three and modulo four.

The fetch address 268 is held in a microcode program counter (not shown). Initially, i.e., when the fast translator 154 switches to microcode mode, the microcode program counter is loaded with the address of the microcode routine provided by the fast translator 154. As described above, a local branch instruction is one that is resolved by the instruction translator 104, more specifically by the microcode unit 156, rather than by the execution pipeline 192. Conversely, a non-local branch instruction is one that must be issued to the execution pipeline 192 for resolution and cannot be resolved by the microcode unit 156. Resolving a branch instruction means determining whether the branch instruction is taken or not taken and, if taken, the target address of the branch instruction. Each time a fetch quantum 296 is fetched from the microcode ROM 202, the fetch address 268 (i.e., the microcode program counter) is updated. If the branch decoder 208 determines that the fetch quantum 296 is absent any local branch instructions, then the address generator 206 causes the next sequential instructions to be fetched. More specifically, an adder 226 increments the fetch address 268 by four, i.e., by the size of the fetch quantum 296. However, if the branch decoder 208 detects a local branch instruction in the fetch quantum 296, the branch decoder 208 resolves the local branch instruction and, if its direction is taken, the branch decoder 208 provides the resolved target address 266 to the address generator 206 for update of the microcode program counter to fetch the next fetch quantum 296 at the resolved target address 266.

In the case of a call microcode instruction, the direction is always taken, and the target address 266 computed by the branch decoder 208 is the next sequential address after the call instruction, which is a return address that is provided to the call/return unit 222 and pushed onto a current call/return stack 254, as described in more detail below. Call microcode instructions are resolved by the microcode unit 156 and are thus local branch instructions. In the case of a return microcode instruction, the direction is always taken, and a return address 298 is popped from the current call/return stack 254, as described in more detail below, and provided to the address generator 206 for updating the microcode program counter. Return microcode instructions are resolved by the microcode unit 156 and are thus local branch instructions. Unconditional jump microcode instructions are always taken, and they may be local or non-local branches. In the case of a local unconditional jump, the target address 266 is specified in the instruction itself, whereas the execution pipeline 192 computes the target address of a non-local unconditional jump. Similarly, conditional jump microcode instructions may be either local or non-local. In the case of a local conditional jump microcode instruction, the microcode unit 156 resolves the direction and the target address 266 is included in the instruction itself, whereas the execution pipeline 192 resolves the direction and computes the target address of a non-local conditional jump. Preferably, the microcode unit 156 effectively predicts that all non-local branch instructions are not taken and does not interrupt the sequential fetching process on account of the presence of a non-local branch instruction in the fetch quantum 296. Consequently, if the execution pipeline 192 resolves the non-local branch instruction as taken, the microcode unit 156 pipeline is flushed, including the microcode instruction queue 212, and the execution pipeline 192 provides a new target address for updating the microcode program counter.

The branch decoder 208 receives the fetch quantum 296 from the microcode ROM 202 and passes them microcode instructions 272 through as microcode instructions 274. The branch decoder 208 decodes the fetch quantum 296 looking for both local and non-local branch instructions. In particular, the branch decoder 208 searches the lanes from 0 to 3 of the received fetch quantum 296, i.e., in program order, and detects the first lane, if any, having a local branch instruction, referred to herein as the "first-in-program-order local branch instruction." The branch decoder 208 also determines the number of non-local branches in the fetch quantum 296 in lanes prior to the lane having the first-in-program-order local branch instruction and outputs the number to the call/return unit 222 on a signal num_non-local_br 282. The branch decoder 208 also determines whether the first-in-program-order local branch instruction is a call instruction and, if so, asserts a push signal 284 provided to the call/return unit 222. The branch decoder 208 also determines whether the first-in-program-order local branch instruction is a return instruction and, if so, asserts a pop signal 286 provided to the call/return unit 222.

The branch decoder 208 also provides a signal num_valid_instrs 288 to the queue controller 214, which indicates the number of instructions in the fetch quantum 296 that are to be written into the queue 212. More specifically, if the num_valid_instrs 288 value is N, then the first N microcode instructions 274 provided by the branch decoder 208 are written into the queue 212. The queue controller 214 controls the writing of the microcode instructions 274 to a location in the queue 212 specified by a write pointer 244 provided to the queue 212. The queue controller 214 updates the write pointer 244 by incrementing the current write pointer 244 value by the num_valid_instrs 288 modulo the size of the queue 212, i.e., the number of entries in the queue 212. Finally, the branch decoder 208 provides the target address 266 of the first-in-program-order local branch instruction to the address generator 206. The num_valid_instrs 288 is the number of instructions in the fetch quantum 296 before but not including the first-in-program-order local branch instruction. Thus, if there are no local branch instructions, then the num_valid_instrs 288 is four; if the first-in-program-order local branch instruction is in lane 3, the num_valid_instrs 288 is three; if the first-in-program-order local branch instruction is in lane 2, the num_valid_instrs 288 is two; if the first-in-program-order local branch instruction is in lane 1, the num_valid_instrs 288 is one; and if the first-in-program-order local branch instruction is in lane 0, the num_valid_instrs 288 is zero. Thus, when the branch decoder 208 detects a local branch instruction in the fetch quantum 296, it effectively throws away the microcode instructions 274 after and including the first-in-program-order local branch instruction, i.e., it causes them not to be written into the queue 212.

Positioning the branch decoder 208 functionally between the microcode ROM 202 and the queue 212 so that it decodes the fetch quantum 296 before it is written to the queue 212 has advantages over positioning the branch decoder 208 functionally after the queue 212. First, it enables writing into the queue 212 only microcode instructions of the fetch quantum 296 up to but not including the first-in-program-order local branch instruction, and not writing into the queue 212 the microcode instructions following the first-in-program-order local branch instruction. This may save power. Additionally, it avoids the need to do a performance-diminishing flush of the queue 212 in the event that the branch decoder 208 decoded a local branch.

The queue 212 asserts full 264 to the address generator 206 when it is full of microcode instructions 274, which induces the address generator 206 to stop fetching instructions from the microcode ROM 202. However, advantageously, as long as the queue 212 is not full, the address generator 206 may continue to fetch and attempt to populate the queue 212 with microcode instructions 274 even when the execution pipeline 192 is unable to receive microinstructions 138 from the instruction translator 104, e.g., because the execution pipeline 192 is stalled. Additionally, the queue 212 may reduce a performance penalty associated with the length of the microcode unit 156 pipeline, which in one embodiment includes four pipeline stages, thus incurring four clock cycles from access of the microcode ROM 202 to provision of the microinstructions 134 translated therefrom to the execution pipeline 192.

The queue 212 asserts empty 262 to the microcode translators 216 when it is empty of microcode instructions 274, which induces the microcode translators 216 to stop translating microcode instructions 276 into the microinstructions 134 of FIG. 1. However, advantageously, as long as the queue 212 is not empty, the microcode translators 216 read microcode instructions 276 from the queue 212 each clock cycle and translate them into microinstructions 134. Preferably, the queue 212 provides along with each of the microcode instructions 276 a valid signal to indicate with the respective microcode instruction 276 is valid or not so that the microcode translators 216 do not translate invalid microcode instructions 276. For example, if the queue 212 only contains two microcode instructions 276, then the queue 212 provides them on lanes 0 and 1 and asserts the valid signals associated with lanes 0 and 1, but de-asserts the valid signals associated with lanes 2 and 3. Preferably, the queue controller 214 determines the number of microcode instructions 276 in the queue 212 as the difference of the write pointer 244 value minus a read pointer 242 value, described below.

The microcode translators 216 provide a num_translated signal 246 to the queue controller 214 that indicates the number of microcode instructions 276 translated into microinstructions 134 in the given clock cycle. The queue controller 214 controls the reading of the microcode instructions 276 from a location in the queue 212 specified by a read pointer 242 provided to the queue 212. The queue controller 214 updates the read pointer 242 by incrementing the current read pointer 242 value by the num_translated signal 246 value modulo the size of the queue 212, i.e., the number of entries in the queue 212.

In one embodiment, a microcode instruction 276 may be translated into between one and four microinstructions depending upon the complexity of the microcode instruction 276. Preferably, there are four microcode translators 216, each capable of translating a microcode instruction 276 into a different number of microinstructions. Preferably, the translator 216 of lane 0 is capable of translating any type of microcode instruction 276 into the required number of microinstructions, i.e., up to four; the translator 216 of lane 1 is capable of translating types of microcode instructions 276 that require between one and three microinstructions; the translator 216 of lane 2 is capable of translating types of microcode instructions 276 that require between one and two microinstructions; and the translator 216 of lane 3 is capable of translating types of microcode instructions 276 that require only one microinstruction. The microcode translators 216 include a mux matrix (not shown) that receives the outputs of the four microcode translators 216 and selects the valid microinstructions for provision as microinstructions 134 to the mux 152 of FIG. 1. Thus, for example, in a given clock cycle the microcode translator 216 of lane 0 may encounter a microcode instruction 276 that it translates into a single microinstruction 134, and the microcode translator 216 of lane 1 may encounter a microcode instruction 276 that requires translation into four microinstructions 134, in which case the microcode translators 216 will only provide the single microinstruction 134 translated from the microcode instruction 276 in lane 0, since there are only three remaining slots for the microinstructions 134, not four. However, advantageously the microcode instruction queue 212 provides a buffer to potentially ameliorate the effects of the variability in the number of microcode instructions that are translated each clock cycle due to the variability in the complexity within a stream of the microcode instructions and the locations of the variable complexity microcode instructions within the stream relative to one another.

The call/return unit 222 includes a speculative pointer 258, a non-speculative pointer 256, a plurality of call/return stack 254 and a corresponding plurality of counters 252 associated with the call/return stacks 254. The speculative pointer 258 points to the current call/return stack 254, i.e., the call/return stack 254 onto which a return address 266 is pushed/popped in response to a call/return microcode instruction. The speculative pointer 258 also points to the counter 252 associated with the current call/return stack 254.

The non-speculative pointer 256 points to the non-speculative call/return stack 254 and associated counter 252 to which the microcode unit 156 reverts in the event that a non-local branch instruction is resolved by the execution pipeline 192 to be taken, i.e., that was implicitly incorrectly predicted by the microcode unit 156 to be not taken. That is, the non-speculative call/return stack 254 holds return addresses associated with call instructions that were encountered by the branch decoder 208 when there were no unresolved non-local branch instructions in the processor 100. In this case, the speculative pointer 258 is loaded with the value of the non-speculative pointer 256, i.e., is updated to point to the non-speculative call/return stack 254.

Each counter 252 counts the number of non-local branch instructions that have been encountered by the branch decoder 208 since the corresponding call/return stack 254 was allocated. The call/return unit 222 allocates a new call/return stack 254 when the branch decoder 208 encounters the first call/return instruction (i.e., when the branch decoder 208 asserts push 284/pop 286) since one or more non-local branch instructions have been encountered, which is indicated by the current counter 252 value being non-zero. In this case, the call/return unit 222 copies the contents of the current call/return stack 254 to the newly allocated call/return stack 254 and updates the speculative pointer 258 to point to the newly allocated call/return stack 254 to make it the current call/return stack 254 prior to pushing/popping the return address onto/off it. The counter 252 associated with the newly allocated call/return stack 254 is cleared to zero. It is noted that one or more non-local branch instructions preceding a call/return instruction may be present in the same fetch quantum 296, in which case the call/return unit 222 both increments the current counter 252 and allocates a new call/return stack 254 onto/off which it pushes/pops a return address. Each time the execution pipeline 192 resolves a non-local branch instruction, the call/return unit 222 decrements the non-speculative counter 252. When the non-speculative counter 252 decrements to zero, this indicates there are no more unresolved non-local branch instructions associated with the non-speculative call/return stack 254, so the call/return unit 222 increments the non-speculative pointer 256 to point to the next call/return stack 254.

In one embodiment, the call/return unit 222 operates in a manner similarly to the fast call/return stack unit of the microcode unit described in U.S. Pat. No. 7,975,132, which is hereby incorporated by reference for all purposes, but which is modified to accommodate the fetching of multiple microcode instructions per clock cycle from the microcode ROM rather than a single microcode instruction per clock cycle. More specifically, the branch decoder 208 detects the number of non-local branch instructions before the first-in-program-order local branch instruction in the fetch quantum 296 as described above, and the call/return unit 222 increments the current counter 252 by the number, rather than by one.

Preferably, the microcode unit 156 also includes a patch random access memory (RAM) (not shown) and a patch content-addressable memory (CAM) that are writable by system software (e.g., BIOS or the operating system, e.g., via an x86 write model specific register (WRMSR) architectural instruction) to patch the microcode. The patch CAM receives the fetch address 268 and the three incremented values thereof. If the fetch address 268 or any of the incremented values thereof hits an address in the patch CAM, the patch CAM provides an address to the patch RAM. In response, the patch RAM provides a microcode instruction, and a mux (not shown) selects the microcode instruction from the patch RAM rather than the microcode instructions 272 from the microcode ROM 202.

Although an embodiment is described in which the number of microcode instructions 272 fetched from the microcode ROM 202 per clock cycle is four, other embodiments are contemplated in which the number is more or less than four, although at least two. Additionally, although an embodiment is described in which the number of microcode instructions 276 translated by the microcode translators 216 per clock cycle is up to four, other embodiments are contemplated in which the number is more or less than four, although at least two. Finally, although an embodiment is described in which the number of microinstructions 134 provided by the instruction translator 104 to the execution pipeline 192 per clock cycle is up to four, other embodiments are contemplated in which the number is more or less than four, although at least two.

Referring now to FIG. 3, a flowchart illustrating operation of the microcode unit 156 of FIG. 2 is shown. Flow begins at block 302.

At block 302, the address generator 206 provides a fetch address 268 to the microcode ROM 202 which responsively provides a fetch quantum 296 of four microcode instructions 272 to the branch decoder 208. Flow proceeds to block 304.

At block 304, the branch decoder 208 decodes the fetch quantum 296 to detect local and non-local branch instructions, if any. Flow proceeds to block 306.

At block 306, the branch decoder 208 provides to the call/return unit 222 the number of non-local branch instructions in the fetch quantum 296 that appear in program order before the first-in-program-order local branch instruction, which may be zero. In response the call/return unit 222 increments the current counter 252 by the number. Flow proceeds to decision block 308.

At decision block 308, the branch decoder 208 determines whether the first-in-program-order local branch instruction is a call/return instruction. If not, flow proceeds to block 314; otherwise, flow proceeds to block 312.

At block 312, if the first-in-program-order local branch instruction is a call instruction, the branch decoder 208 asserts the push signal 284 to the call/return unit 222, which responsively pushes the target address 266 onto the current call/return stack 254 for provision to the address generator 206. However, if the first-in-program-order local branch instruction is a return instruction, the branch decoder 208 asserts the pop signal 286 to the call/return unit 222, which responsively pops the return address 298 off the current call/return stack 254 for provision to the address generator 206. Flow proceeds to block 314.

At block 314, the branch decoder 208 indicates to the microcode instruction queue 212 which microcode instructions in the fetch quantum 296 are to be written into the queue 212. More specifically, only the microcode instructions in the fetch quantum 296 up to but not including the first-in-program-order local branch instruction are written to the queue 212, as described above. Flow proceeds to block 316.

At block 316, the branch decoder 208 resolves the first-in-program-order local branch instruction, if any, and updates the fetch address 268 to the target address 266 of the resolved first-in-program-order local branch instruction. Otherwise, the address generator 206 increments the fetch address 268 by four. As long as the queue 212 is not full, flow returns to block 302 to fetch the next fetch quantum 296 into the queue 212.

Referring now to FIG. 4, a flowchart illustrating operation of the microcode unit 156 of FIG. 2 is shown. Flow begins at block 402.

At block 402, in parallel to the operation of FIG. 3 in which fetch quanta 296 of microcode instructions are fetched from the microcode ROM 202, decoded by the branch decoder 208 and resolved in the case of local branch instructions, and written to the queue 212, as long as the queue 212 is not empty, the microcode translators 216 read microcode instructions from the queue 212 and translate them into microinstructions for provision to the execution pipeline 192. Flow ends at block 402.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line or other communications medium. Embodiments of the apparatus and method described herein may be included in a semi-conductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A processor having an instruction set architecture (ISA), the processor comprising:
    an execution pipeline having a plurality of execution units that execute microinstructions; and
    an instruction translator that translates architectural instructions defined by the ISA into the microinstructions, the instruction translator comprising:
        a memory that holds microcode instructions and provides a plurality of microcode instructions per clock cycle in response to an address;
        a queue that holds microcode instructions provided by the memory;
        a branch decoder, coupled between the memory and the queue, that decodes the plurality of microcode instructions provided by the memory to detect one or more local branch instructions among the plurality of microcode instructions, causes microcode instructions of the plurality of microcode instructions up to but not including a first-in-program-order local branch instruction of the one or more local branch instructions to be written to the queue, and prevents the first-in-program-order local branch instruction and following microcode instructions of the plurality of microcode instructions from being written to the queue, wherein local branch instructions are resolved by the instruction translator rather than the execution pipeline; and
        a plurality of microcode translators that translate a plurality of microcode instructions received from the queue per clock cycle into a plurality of microinstructions for provision to the execution pipeline.

2. The processor of claim 1, further comprising:
wherein the plurality of microcode instructions provided by the memory per clock cycle is at least four.

3. The processor of claim 1, further comprising:
the instruction translator further includes a call/return unit having a plurality of call/return stacks that hold return addresses associated with call instructions that have been decoded by the branch decoder and for which a corresponding return instruction has not yet been decoded by the branch decoder; and
wherein when the first-in-program-order local branch instruction is a call/return instruction, the branch decoder instructs the call/return unit to push/pop a return address onto/from a current one of the plurality of call/return stacks.

4. The processor of claim 3, further comprising:
the call/return unit further includes a plurality of counters corresponding to the plurality of call/return stacks, wherein each counter of the plurality of counters holds a count of non-local branch instructions yet unresolved by the execution pipeline and decoded by the branch decoder while the corresponding one of the plurality of call/return stacks was the current one of the plurality of call/return stacks; and
wherein the branch decoder counts a number of non-local branch instructions that precede the first-in-program-order local branch instruction within the plurality of microcode instructions, and the call/return unit adds the number counted to the one of the plurality of counters corresponding to the current one of the plurality of call/return stacks, wherein non-local branch instructions are resolved by the execution pipeline rather than by the instruction translator.

5. The processor of claim 1, further comprising:
wherein the plurality of microcode instructions provided by the memory per clock cycle in response to an address is N microcode instructions;
the memory comprises N banks, and each bank of the N banks has a single read port;
a first bank of the N banks provides a first of the plurality of microcode instructions in response to the address; and
each bank of the remaining N banks provides a respective one of the plurality of microcode instructions in response to a respective incremented version of the address.

6. The processor of claim 1, further comprising:
a write pointer that points into a location of the queue into which microcode instructions are written each clock cycle; and
a queue controller that increments the write pointer each clock cycle by a number of the microcode instructions written to the queue.

7. The processor of claim 1, further comprising:
a read pointer that points into a location of the queue from which the plurality of microcode translators read microcode instructions; and
a queue controller that increments the read pointer each clock cycle by a number of microcode instructions translated by the plurality of microcode translators.

8. The processor of claim 1, further comprising:
wherein the processor is an x86 ISA processor.

9. The processor of claim 1, further comprising:
wherein the instruction translator is configured to continue to fetch microcode instructions from the memory for provision to the queue until the queue is full even when the execution pipeline is currently unable to receive the microinstructions from the instruction translator.

10. The processor of claim 1, further comprising:
when the plurality of microcode instructions includes a local branch instruction, the address is updated to a target address specified by the first-in-program-order local branch instruction.

11. The processor of claim 1, further comprising:
when the plurality of microcode instructions is absent a local branch instruction, the address is incremented by N, wherein N is the number of the plurality of microcode instructions provided by the memory per clock cycle.

12. The processor of claim 1, further comprising:
wherein each of the plurality of microcode translators is configured to translate a microcode instruction into a different maximum number of microinstructions.

13. A method for translating architectural instructions defined by an instruction set architecture (ISA) of a processor into microinstructions for execution by an execution pipeline having a plurality of execution units, the method comprising:
providing, by a memory, a plurality of microcode instructions per clock cycle in response to an address;
decoding, by a branch decoder coupled between the memory and a queue, the plurality of microcode instructions provided by the memory to detect one or more local branch instructions among the plurality of microcode instructions;
causing microcode instructions of the plurality of microcode instructions up to but not including a first-in-program-order local branch instruction of the one or more local branch instructions to be written to the queue, and preventing the first-in-program-order local branch instruction and following microcode instructions of the plurality of microcode instructions from being written to the queue;
wherein local branch instructions are resolved by the branch decoder rather than by the execution pipeline; and
translating, by a plurality of microcode translators, a plurality of microcode instructions received from the queue per clock cycle into a plurality of microinstructions for provision to the execution pipeline.

14. The method of claim 13, further comprising:
wherein the plurality of microcode instructions provided by the memory per clock cycle is at least four.

15. The method of claim 13, further comprising:
wherein the processor further includes a call/return unit having a plurality of call/return stacks that hold return addresses associated with call instructions that have been decoded by the branch decoder and for which a corresponding return instruction has not yet been decoded by the branch decoder; and
wherein when the first-in-program-order local branch instruction is a call/return instruction:
instructing, by the branch decoder, the call/return unit to push/pop a return address onto/from a current one of the plurality of call/return stacks.

16. The method of claim 15, further comprising:
wherein the call/return unit further includes a plurality of counters corresponding to the plurality of call/return stacks, wherein each counter of the plurality of counters holds a count of non-local branch instructions yet unresolved by the execution pipeline and decoded by the branch decoder while the corresponding one of the plurality of call/return stacks was the current one of the plurality of call/return stacks; and
counting, by the branch decoder, a number of non-local branch instructions that precede the first-in-program-order local branch instruction within the plurality of microcode instructions;
adding, by the call/return unit, the number counted to the one of the plurality of counters corresponding to the current one of the plurality of call/return stacks; and
wherein non-local branch instructions are resolved by the execution pipeline rather than by the branch decoder.

17. The method of claim 13, further comprising:
wherein the plurality of microcode instructions provided by the memory per clock cycle in response to an address is N microcode instructions;
wherein the memory comprises N banks, and each bank of the N banks has a single read port;
providing, by a first bank of the N banks, a first of the plurality of microcode instructions in response to the address; and
providing, by each bank of the remaining N banks, a respective one of the plurality of microcode instructions in response to a respective incremented version of the address.

18. The method of claim 13, further comprising:
pointing, by a write pointer, into a location of the queue into which microcode instructions are written each clock cycle; and
incrementing the write pointer each clock cycle by a number of the microcode instructions written to the queue.

19. The method of claim 13, further comprising:
pointing, by a read pointer, into a location of the queue from which the plurality of microcode translators read microcode instructions; and
incrementing the read pointer each clock cycle by a number of microcode instructions translated by the plurality of microcode translators.

20. The method of claim 13, further comprising:
continuing to fetch microcode instructions from the memory for provision to the queue until the queue is full even when the execution pipeline is currently unable to receive the microinstructions from the instruction translator.

21. A computer program product encoded in at least one non-transitory computer usable medium for use with a computing device, the computer program product comprising:
computer usable program code embodied in said medium, for specifying a processor having an instruction set architecture (ISA), the computer usable program code comprising:

first program code for specifying an execution pipeline having a plurality of execution units that execute microinstructions; and second program code for specifying an instruction translator that translates architectural instructions defined by the ISA into the microinstructions, the instruction translator comprising:
- a memory that holds microcode instructions and provides a plurality of microcode instructions per clock cycle in response to an address;
- a queue that holds microcode instructions provided by the memory;
- a branch decoder, coupled between the memory and the queue, that decodes the plurality of microcode instructions provided by the memory to detect one or more local branch instructions among the plurality of microcode instructions, causes microcode instructions of the plurality of microcode instructions up to but not including a first-in-program-order local branch instruction of the one or more local branch instructions to be written to the queue, and prevents the first-in-program-order local branch instruction and following microcode instructions of the plurality of microcode instructions from being written to the queue, wherein local branch instructions are resolved by the instruction translator rather than the execution pipeline; and
- a plurality of microcode translators that translate a plurality of microcode instructions received from the queue per clock cycle into a plurality of microinstructions for provision to the execution pipeline.

* * * * *